US009941728B2

United States Patent
Katsumata et al.

(10) Patent No.: US 9,941,728 B2
(45) Date of Patent: Apr. 10, 2018

(54) BATTERY CHARGING DEVICE

(71) Applicant: KOKUSAN DENKI CO., LTD., Shizuoka-Ken (JP)

(72) Inventors: Nozomu Katsumata, Gotemba (JP); Shuichi Muramatsu, Fuji (JP); Masaki Asari, Izunokuni (JP); Tomoya Tamakawa, Fuji (JP); Akinari Ueki, Izunokuni (JP)

(73) Assignee: KOKUSAN DENKI CO., LTD., Shizuoka-Ken (JP)

( * ) Notice: Subject to any disclaimer, the term of this patent is extended or adjusted under 35 U.S.C. 154(b) by 191 days.

(21) Appl. No.: 14/918,193

(22) Filed: Oct. 20, 2015

(65) Prior Publication Data

US 2016/0118831 A1    Apr. 28, 2016

(30) Foreign Application Priority Data

Oct. 24, 2014    (JP) .................................. 2014-217303

(51) Int. Cl.
*H02J 7/00*    (2006.01)
*H02J 7/14*    (2006.01)

(52) U.S. Cl.
CPC .......... *H02J 7/0072* (2013.01); *H02J 7/0029* (2013.01); *H02J 7/0077* (2013.01); *H02J 7/1461* (2013.01); *H02J 7/1492* (2013.01); *H02J 2007/0037* (2013.01); *Y02T 10/92* (2013.01)

(58) Field of Classification Search
CPC .................................................. H02J 7/0072
USPC ....................................................... 320/107
See application file for complete search history.

(56) References Cited

U.S. PATENT DOCUMENTS

| | | | | |
|---|---|---|---|---|
| 4,958,119 A * | 9/1990 | Fitzner | ................... | H02H 9/041 322/91 |
| 6,061,528 A * | 5/2000 | Ichihara | ................... | G03B 7/26 396/205 |
| 6,215,271 B1 * | 4/2001 | Lerow | ................... | H02J 7/1492 320/104 |
| 6,362,603 B2 * | 3/2002 | Suzuki | ................. | H02J 7/1484 320/152 |
| 2008/0179889 A1 * | 7/2008 | Matsui | ................. | H02J 7/1446 290/36 R |

(Continued)

FOREIGN PATENT DOCUMENTS

| | | |
|---|---|---|
| JP | S63-172241 U | 11/1988 |
| JP | 2007-060857 A | 3/2007 |

*Primary Examiner* — Samuel Berhanu
*Assistant Examiner* — Tessema Kebede
(74) *Attorney, Agent, or Firm* — Pearne & Gordon LLP

(57) ABSTRACT

A battery charging device provided with: a bridge-type controlled rectifier circuit having three-phase thyristors for rectifying the output of a three-phase AC generator and supplying a charging current to a battery; and a controller for controlling the supplying of a trigger signal to the thyristors in accordance with the terminal voltage of the battery; the controller being configured so that the trigger signal is supplied to the thyristors simultaneously when it is detected that the terminal voltage of the battery is equal to or lower than a set voltage, and supplying of the trigger signal is stopped when a certain period has elapsed after the terminal voltage exceeds the set voltage, in order to prevent commutation failure of the thyristors when charging of the battery is stopped, and prevent overcharging of the battery.

14 Claims, 11 Drawing Sheets

(56) References Cited

U.S. PATENT DOCUMENTS

| | | | | |
|---|---|---|---|---|
| 2008/0278120 A1* | 11/2008 | Sato | ............... | H02J 7/1446 |
| | | | | 322/28 |
| 2010/0026246 A1* | 2/2010 | Yamaguchi | ............ | H02H 5/04 |
| | | | | 320/152 |
| 2013/0051097 A1* | 2/2013 | Katsumata | ............ | H02M 7/17 |
| | | | | 363/85 |

* cited by examiner

BATTERY CHARGING DEVICE

TECHNICAL FIELD OF THE INVENTION

The present invention relates to a battery charging device for charging a battery by the output of a three-phase AC generator.

BACKGROUND OF THE INVENTION

As described in Japanese Laid-open Utility Model Application No. 63-172241, open-type battery charging devices for supplying a charging current from a generator to a battery through a controlled rectifier circuit are widely used as devices for charging a battery by the output of a three-phase AC (alternating-current) generator driven by a motor such as an engine mounted in a vehicle or the like. The controlled rectifier circuit used is commonly a full-bridge controlled rectifier circuit configured from a hybrid bridge circuit provided with three-phase legs, in each of which either one of a top side and a bottom side comprises a thyristor and the other comprises a feedback diode. In an open-type battery charging device, the three-phase thyristors of the controlled rectifier circuit are turned on when the terminal voltage of the battery is equal to or lower than a set voltage, whereby a charging current is distributed from the generator to the battery through the controlled rectifier circuit, and when the terminal voltage of the battery exceeds the set voltage, the three-phase thyristors are turned off, and output terminals of the generator are placed in an open-circuit state, thereby stopping the supply of charging current to the battery.

As a method for controlling the on/off state of the thyristors of the controlled rectifier circuit in the open-type battery charging device, a trigger signal is applied to the thyristors of the three phases U, V, and W simultaneously when the terminal voltage of the battery is equal to or lower than the set voltage, and the trigger signals applied to the three-phase thyristors are simultaneously eliminated when the terminal voltage of the battery exceeds the set voltage, as described in Japanese Laid-open Utility Model Application No. 63-172241.

In the open-type battery charging device, when the trigger signal is applied to the three-phase thyristors simultaneously when the voltage of the battery becomes equal to or lower than the set voltage, each thyristor turns on when a forward voltage is applied across the anode and cathode thereof, and a charging current is supplied to the battery. As illustrated at the left end of FIG. 9, immediately after the charging current begins to flow to the battery, a transient state occurs in which the peak values of the positive and negative half waves of three-phase alternating-current output currents Iu, Iv, and Iw of the generator are unbalanced, but the transient state subsides as a time t elapses.

When the trigger signals applied to the three-phase thyristors are simultaneously eliminated when the voltage of the battery exceeds the set voltage, a thyristor that is off at the time the trigger signal is eliminated is no longer re-triggered, but a thyristor that is on at the time the trigger signal is eliminated is held in the on state and turned off once the anode current thereof is less than a holding current. The current of a phase in which the thyristor thereof is not re-triggered becomes zero at the time the negative half-wave current flowing through the feedback diode thereof becomes zero. For example, as illustrated in FIG. 10, when the trigger signals applied to the three-phase thyristors simultaneously are eliminated at a timing ta in a period in which the U-phase current Iu is a positive half wave, although the V-phase and W-phase thyristors are not re-triggered, the U-phase thyristor is held in the on state, and the positive half wave of the U-phase current Iu therefore continues to flow. The V-phase current Iv and the W-phase current Iw are extinguished at the time that the negative half-wave currents flowing through the V-phase and W-phase feedback diodes connected in series to the V-phase thyristor and W-phase thyristor, respectively, become zero.

The waveform of the positive half wave of the current Iu flowing through the U-phase thyristor after supplying of the trigger signal to the three-phase thyristors is stopped switches from a three-phase alternating-current waveform to a single-phase alternating-current waveform at the time that the negative half wave of the V-phase current Iv flowing through the V-phase feedback diode becomes zero. The single-phase alternating-current waveform current Iu continues to flow until the negative half wave of the current Iw flowing through the W-phase feedback diode becomes zero. If the waveform of the current Iu were to remain as a three-phase alternating-current waveform, the current Iu would vary along the trajectory indicated by a dashed line in FIG. 10 and become zero before the negative half wave of the W-phase current Iw becomes zero. However, the current Iu actually continues to flow after switching to the single-phase alternating-current waveform until the negative half wave of the current Iw flowing through the W-phase feedback diode becomes zero. Therefore, relative to a case in which the waveform of the current Iu remains as a three-phase alternating-current waveform, the timing at which the current Iu becomes zero is delayed by a certain delay time td, and the commutation margin time (time until a forward voltage is again applied to a thyristor after the current flowing through the thyristor becomes zero) of the thyristor thereof is reduced by an amount commensurate with the delay time td. In order to turn off a thyristor that is on when supplying of the trigger signal to the three-phase thyristors is stopped, and to stop the supply of charging current to the battery, the commutation margin time of the thyristor must be greater than the turn-off time (time needed for the thyristor to change from on to off) thereof.

As described above, when a thyristor (the U-phase thyristor in the example described above) that is on when the three-phase trigger signals are extinguished is turned off, the commutation margin time thereof decreases, but when a transient state in which the peak values of the positive and negative half waves of the three-phase alternating-current output current are unbalanced is not occurring in the generator, the thyristor can be turned off without hindrance. FIG. 11 illustrates the waveforms of the three-phase currents Iu, Iv, Iw in a case in which the U-phase thyristor, which is on when supplying of the trigger signal is stopped, is successfully turned off after supplying of the trigger signal to the three-phase thyristors is stopped at the timing ta. When it is detected that the battery voltage exceeds the set voltage, and supplying of the trigger signal to the three-phase thyristors is stopped, in a case in which a thyristor that was on can ultimately be turned off without hindrance, as illustrated in FIG. 11, the supply of charging current to the battery is then stopped until the terminal voltage of the battery is again equal to or lower than the set voltage, and the battery does not become overcharged.

However, when the battery voltage is detected to exceed the set voltage in a state in which the transient state of the generator has not subsided after supplying of the charging current to the battery is started, and supplying of the trigger signal to the three-phase thyristors is stopped, after supplying of the trigger signal is stopped at timing ta, as illustrated in FIG. 12, the thyristor that is to be finally turned off (the U-phase thyristor in this example) can no longer be turned off, the charging current continues to flow to the battery even after supplying of the trigger signal is stopped, and the battery may become overcharged. Such a state is prone to occur particularly when the generator is rotating at high speed.

In order to prevent such problems, a battery charging device has been proposed in which unbalancing of the three-phase output currents that occurs at the start of battery charging is suppressed by controlling the phase in which thyristors are triggered, as described in Japanese Laid-open Patent Application No. 2007-60857. According to this battery charging device, it is possible to suppress unbalancing of the three-phase output currents of the generator at the start of battery charging, and it is therefore possible to prevent a failure to turn off the thyristors when the voltage of the battery exceeds the set voltage immediately after the start of battery charging, and to prevent overcharging of the battery.

SUMMARY OF THE INVENTION

According to the invention disclosed in Japanese Laid-open Patent Application No. 2007-60857, although overcharging of the battery can be prevented, the thyristors of the controlled rectifier circuit are turned on in only a specific phase, and the problems therefore arise that maximum output cannot be extracted from the three-phase AC generator, and that the output that can be extracted from the generator is reduced in comparison with a case in which the phase of triggering the thyristors is not controlled. When the output that can be extracted from the generator is limited, a larger generator must be prepared to charge the same battery, which is undesirable because of higher cost and increased size of the device.

An object of the present invention is to provide a battery charging device configured so that thyristors can be reliably turned off even when the battery voltage exceeds the set voltage and triggering of the three-phase thyristors is stopped before subsiding of a transient state of the generator that occurs when the battery voltage is equal to or lower than the set voltage and charging of the battery is started, and so that there is no need to perform phase control for suppressing the occurrence of a transient state, and overcharging of the battery can thus be prevented without causing a decrease in the output of the generator.

The present invention is applied to a battery charging device provided with: a three-phase AC generator; a full-bridge controlled rectifier circuit for rectifying the output of the three-phase AC generator and supplying a charging current to a battery, the controlled rectifier circuit including a hybrid bridge circuit having three-phase legs, in each of which either one of a top side and a bottom side comprises a thyristor, and the other comprises a feedback diode; and a controller for controlling the supplying of a trigger signal to the three-phase thyristors provided to the three-phase legs of the controlled rectifier circuit, in accordance with a terminal voltage of the battery. In the present specification, at least the first through eighth aspects of the invention described below are disclosed in order to achieve the aforementioned object.

First Aspect

In a first aspect of the present invention disclosed in the present specification, the controller is configured so that the trigger signal is applied to the three-phase thyristors simultaneously when it is detected that the terminal voltage of the battery is equal to or lower than a set voltage, and when it is detected that the terminal voltage of the battery exceeds the set voltage, supplying of the trigger signal to the three-phase thyristors is stopped when a certain trigger stop waiting period has elapsed after the terminal voltage of the battery exceeds the set voltage.

When the controller is configured as described above, setting the trigger stop waiting period to the appropriate length makes it possible to prevent the supply of the trigger signal to the thyristors from being stopped in a state in which the transient state of the generator has not subsided, and to reliably turn off the thyristors. Consequently, the thyristors can reliably be turned off even when phase control for suppressing the occurrence of a transient state at the start of charging of the battery is not performed, and overcharging of the battery can be prevented without causing a decrease in the output of the generator.

Second Aspect

In a second aspect of the present invention disclosed in the present specification, the controller is provided with: a battery voltage detection circuit for detecting the terminal voltage of the battery; trigger command generating means for generating a trigger command signal when the terminal voltage of the battery detected by the battery voltage detection circuit is equal to or lower than the set voltage, and extinguishing the trigger command signal when the terminal voltage of the battery detected by the battery voltage detection circuit exceeds the set voltage; and a timer-function-equipped thyristor trigger circuit configured so as to supply the trigger signal to the three-phase thyristors simultaneously when the trigger command generating means generates the trigger command signal, and stop supplying of the trigger signal to the three-phase thyristors after waiting for a certain trigger stop waiting period to elapse when the trigger command signal is extinguished.

Third Aspect

A third aspect of the present invention is applied to the second aspect of the present invention. In the present invention, the timer-function-equipped thyristor trigger circuit is provided with a timer capacitor connected in parallel through a current-limiting element across gate cathodes of each of the three-phase thyristors and charged through a discharge-inhibiting diode by the trigger command signal, and the timer-function-equipped thyristor trigger circuit is configured so that the trigger stop waiting period is the period for which a current equal to or greater than a threshold value flows across the gate cathodes of the thyristors by discharging of a charge accumulated in the timer capacitor through the current-limiting element and across the gate cathodes of the thyristors at a certain time constant when the trigger command signal is extinguished.

Fourth Aspect

In a fourth aspect of the present invention, the controller is configured so that the trigger signal is supplied to the three-phase thyristors simultaneously when it is detected that the terminal voltage of the battery is equal to or lower than a set voltage, and supplying of the trigger signal to the three-phase thyristors is stopped when it is detected that the terminal voltage of the battery exceeds the set voltage and it is confirmed that the set trigger stop waiting period has already elapsed from the time when the trigger signal was applied to the three-phase thyristors simultaneously.

Also when the present invention is configured as described above, setting the trigger stop waiting period to the appropriate length makes it possible to prevent the supply of the trigger signal to the thyristors from being stopped in a state in which the transient state of the generator has not subsided, and to reliably turn off the thyristors.

According to any of the first through third aspects of the present invention, supplying of the trigger signal to the thyristors is always stopped after waiting for the trigger stop waiting period to elapse when it is detected that the terminal voltage of the battery exceeds the set voltage, and supplying of the trigger signal to the thyristors is therefore continued until a certain trigger stop waiting period elapses even when the transient state of the generator has already subsided by the time it is detected that the terminal voltage of the battery exceeds the set voltage. In contrast, according to the fourth aspect of the present invention, supplying of the trigger signal to the thyristors can be immediately stopped without waiting for the trigger stop waiting period to elapse when the transient state of the generator has already subsided by the time it is detected that the terminal voltage of the battery exceeds the set voltage, and it is therefore possible to prevent the trigger signal from being unnecessarily supplied to the thyristors after charging of the battery is completed, and to more precisely control charging of the battery.

Fifth Aspect

In a fifth aspect of the present invention, a more specific configuration of the controller used in the fourth aspect is clarified. In the fifth aspect of the present invention, the controller comprises: battery voltage detecting means for detecting the terminal voltage of the battery; waiting period determining means for determining the trigger stop waiting period to be set immediately after the time when the trigger signal is applied to the three-phase thyristors simultaneously in order to delay stopping of triggering of the thyristors; a timer for starting measurement of a measurement value for measuring the trigger stop waiting period when the measurement value is set; trigger command/trigger stop command generating means for generating a trigger command when the terminal voltage of the battery detected by the battery voltage detecting means is equal to or lower than the set voltage, and generating a trigger stop command when the terminal voltage of the battery detected by the battery voltage detecting means exceeds the set voltage; timer setting means for setting a measurement value for measuring the trigger stop waiting period in the timer, in which the timer starts measurement of the measurement value when the trigger command is generated; and a trigger signal supply circuit for supplying the trigger signal to the three-phase thyristors simultaneously when the trigger command is generated, and stopping the supply of the trigger signal to the three-phase thyristors when the trigger stop command is generated and it is confirmed that the timer has finished measuring the measurement value for measuring the trigger stop waiting period.

Sixth Aspect

A sixth aspect of the present invention is applied to the fifth aspect of the present invention and configured so that the controller is further provided with speed detecting means for detecting the rotational speed of the generator, and the waiting period determining means is configured so as to set the trigger stop waiting period in accordance with the speed detected by the speed detecting means.

Seventh Aspect

A seventh aspect of the present invention is applied to the sixth aspect of the present invention. In the present invention, the waiting period determining mean is configured so that a first trigger stop waiting period is used as the trigger stop waiting period when the speed detected by the speed detecting means is less than a set speed, and a second trigger stop waiting period longer than the first trigger stop waiting period is used as the trigger stop waiting period when the speed detected by the speed detecting means is equal to or greater than the set speed.

Eighth Aspect

An eighth aspect of the present invention is applied to any of the first through seventh aspects of the present invention, and in the present invention, the trigger stop waiting period is set so as to be equal to or greater than the time needed for subsiding of a transient state of the generator that occurs when the trigger signal is applied to the three-phase thyristors simultaneously and the three-phase thyristors are turned on.

According to the present invention, the controller is configured so that the trigger signal is applied to the three-phase thyristors simultaneously when it is detected that the terminal voltage of the battery is equal to or lower than a set voltage, and when it is detected that the terminal voltage of the battery exceeds the set voltage, supplying of the trigger signal to the three-phase thyristors is stopped when a predetermined trigger stop waiting period has elapsed after the terminal voltage of the battery exceeds the set voltage. Therefore, setting the trigger stop waiting period to the appropriate length makes it possible to prevent the supply of the trigger signal to the thyristors from being stopped in a state in which the transient state of the generator has not subsided, and to reliably turn off the thyristors. Consequently, the thyristors can reliably be turned off even when phase control for suppressing the occurrence of a transient state at the start of charging of the battery is not performed, and overcharging of the battery can be prevented without causing a decrease in the output of the generator.

Particularly through the fourth through eighth aspects of the present invention, when it is detected that the terminal voltage of the battery exceeds the set voltage, confirmation is made as to whether the set trigger stop waiting period has already elapsed from the time when the trigger signal was applied to the three-phase thyristors simultaneously, and supplying of the trigger signal to the three-phase thyristors is stopped when it is confirmed that the trigger stop waiting period has already elapsed. Supplying of the trigger signal to the thyristors can therefore be immediately stopped without waiting for the trigger stop waiting period to elapse when the transient state of the generator has already subsided by the time it is detected that the terminal voltage of the battery exceeds the set voltage. Consequently, it is possible to prevent the trigger signal from being unnecessarily supplied to the thyristors after charging of the battery is completed, and to more precisely control charging of the battery.

DETAILED DESCRIPTION OF THE INVENTION

Embodiments of the present invention will be described below with reference to the accompanying drawings.

First Embodiment

Figure 1:
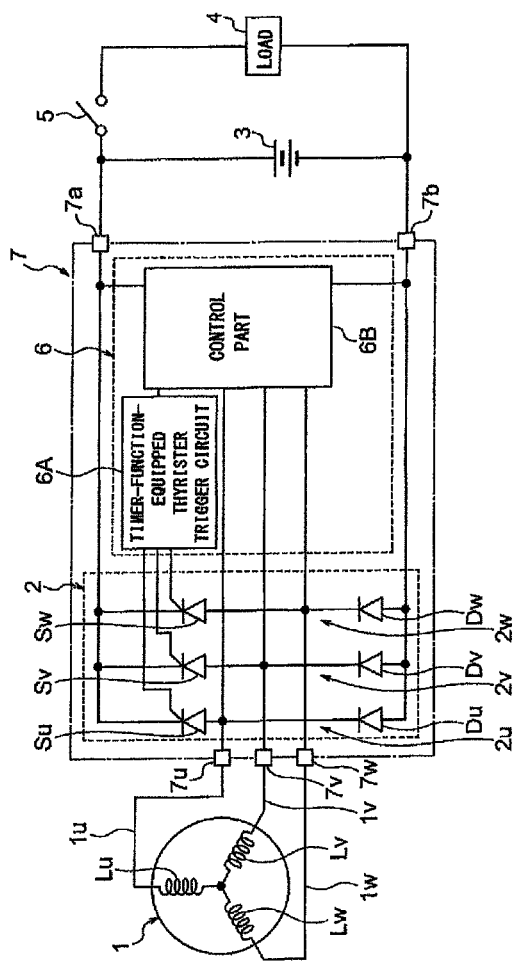
FIG. 1 is a circuit diagram primarily illustrating the hardware configuration of a first embodiment of the present invention.

FIG. 1 primarily illustrates the hardware configuration of a first embodiment of the present invention, and the reference numeral 1 in FIG. 1 refers to a three-phase AC generator mounted in an automobile or other vehicle and driven by an engine for rotating a drive wheel of the vehicle. The three-phase AC generator 1 is provided with a magnetic rotor or other rotor rotated by an engine, and a stator having three-phase magneto coils Lu, Lv, Lw. In the example illustrated in FIG. 1, the three-phase magneto coils Lu through Lw are in a three-phase star connection, and three-phase output terminals 1u through 1w in phases U, V, and W extend from non-neutral ends thereof.

In FIG. 1, the reference numeral 2 refers to a full-bridge controlled rectifier circuit, 3 refers to a battery charged through the controlled rectifier circuit 2 by the output of the three-phase AC generator 1, and 4 refers to a load connected across both terminals of the battery 3 via a switch 5. The reference numeral 6 refers to a controller for controlling the controlled rectifier circuit 2 in accordance with the terminal voltage of the battery 3, the controlled rectifier circuit 2 and the controller 6 are accommodated in a shared case, thereby constituting a charging control unit 7, and the three-phase AC generator 1 and the charging control unit 7 constitute a battery charging device.

More specifically, the controlled rectifier circuit 2 has three-phase legs including: a U-phase leg 2u, a top side and a bottom side of which are composed of a thyristor Su and a diode Du, respectively; a V-phase leg 2v, a top side and a bottom side of which are composed of a thyristor Sv and a diode Dv, respectively; and a W-phase leg 2w, a top side and a bottom side of which are composed of a thyristor Sw and a diode Dw, respectively; and the controlled rectifier circuit 2 is configured from a hybrid bridge circuit having a configuration in which the above-mentioned legs are connected to each other in parallel. The thyristors and diodes constituting the legs of the controlled rectifier circuit 2 are connected in series so that the forward directions thereof are the same, and a common node of cathodes of the thyristors Su through Sw and a common node of anodes of the diodes Du through Dw of the three-phase legs 2u through 2w are connected to direct-current output terminals 7a and 7b of the charging control unit 7 as a plus-side output terminal and a minus-side output terminal, respectively.

The controller 6 is configured so that a trigger signal is applied to the three-phase thyristors Su through Sw of the controlled rectifier circuit 2 simultaneously when it is detected that the terminal voltage of the battery 3 is equal to or lower than a set voltage, and when it is detected that the terminal voltage of the battery 3 exceeds the set voltage, supplying of the trigger signal to the three-phase thyristors is stopped when a certain trigger stop waiting period has elapsed after the terminal voltage of the battery exceeds the set voltage. The controller 6 used in the present embodiment is configured from a timer-function-equipped thyristor trigger circuit 6A and a control part 6B for controlling the timer-equipped thyristor trigger circuit 6A.

Figure 2:
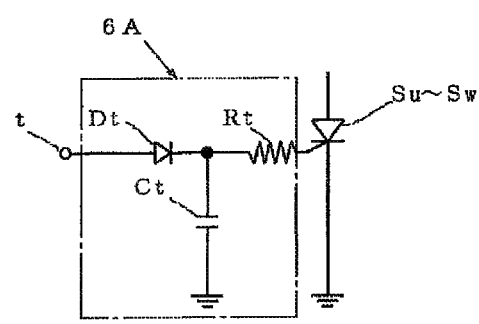
FIG. 2 is a circuit diagram illustrating an example of the configuration of the timer-function-equipped thyristor trigger circuit used in an embodiment of the present invention.

The timer-function-equipped thyristor trigger circuit 6A can be configured as illustrated in FIG. 2, for example. The timer-function-equipped thyristor trigger circuit 6A illustrated in FIG. 2 is configured from a timer capacitor Ct, one end of which is connected to a gate of each of the three-phase thyristors Su through Sw through a resistor Rt as a current-limiting element, and the other end of which is connected to a cathode of each of the thyristors Su through Sw, the timer capacitor being connected in parallel through a current-limiting element across gate cathodes of the thyristors, and a discharge inhibiting diode D connected between a trigger command input terminal t and a connection point between the timer capacitor Ct and the resistor Rt so that an anode thereof is toward the trigger command input terminal t.

The control part 6B is provided with, for example, a battery voltage detection circuit for detecting the terminal voltage of the battery 3, and a trigger command generating means for generating a trigger command signal when the battery voltage detection circuit detects that the terminal voltage of the battery is equal to or lower than the set voltage, and extinguishing the trigger command signal when it is detected that the terminal voltage of the battery exceeds the set voltage.

The abovementioned battery voltage detection circuit can be configured from a resistive voltage divider circuit for dividing the voltage (terminal voltage) across the terminals of the battery 3, for example. The trigger command generating means may also be configured from a circuit for outputting a rectangular-wave signal which rises from zero-level to a high level when the voltage detected by the battery voltage detection circuit falls to a voltage equal to or lower than the set voltage, maintains the high level while the voltage detected by the battery voltage detection circuit is equal to or lower than the set voltage, falls from the high level to zero level when the voltage detected by the battery voltage detection circuit exceeds the set voltage, and maintains zero level while the terminal voltage of the battery exceeds the set voltage. In this case, the period for which the rectangular-wave signal maintains the high level is the period for which the trigger command signal is generated, and the period for which the rectangular-wave signal maintains zero level is the period for which the trigger command signal is extinguished.

In the timer-function-equipped thyristor trigger circuit 6A illustrated in FIG. 2, when the terminal voltage of the battery 3 falls to a voltage equal to or lower than the set voltage and a high-level trigger command signal is applied to the trigger command input terminal t from the control part 6B, the timer capacitor Ct is instantly charged through a diode Dt, and the trigger signal is applied to the thyristors Su through Sw. When the terminal voltage of the battery exceeds the set value, the trigger command signal applied from the control part 6B is extinguished, and the charge accumulated in the timer capacitor Ct is discharged through the resistor Rt and across the gate cathodes of the thyristors Su through Sw at a certain time constant. By this discharging, a state in which the trigger signal is applied to the thyristors Su through Sw is maintained while a current equal to or greater than a threshold value flows across the gate cathodes of the thyristors Su through Sw. Specifically, stopping of the triggering of the thyristors Su through Sw is delayed while the trigger signal is being applied to the thyristors Su through Sw by the discharging of the timer capacitor Ct. In the present embodiment, the period during which the current equal to or greater than a threshold value flows through the current-limiting element and across the gate cathodes of the thyristors is the trigger stop waiting period.

The trigger stop waiting period is preferably set so as to be equal to or greater than the time needed for subsiding of a transient state in the generator 1 that occurs when the trigger signal is applied to the three-phase thyristors Su through Sw simultaneously and the three-phase thyristors Su through Sw are turned on.

When the controller 6 is configured as in the present embodiment, setting the trigger stop waiting period to the appropriate length makes it possible to prevent the supply of the trigger signal to the thyristors Su through Sw from being stopped in a state in which the transient state of the generator 1 has not subsided, and to reliably turn off the thyristors Su through Sw. Consequently, the thyristors can reliably be turned off even when phase control for suppressing the occurrence of a transient state at the start of charging of the battery 3 is not performed, and overcharging of the battery can be prevented without causing a decrease in the output of the generator.

Second Embodiment

In the first embodiment, the controller is configured so that supplying of the trigger signal to the three-phase thyristors is stopped when a certain trigger stop waiting period has elapsed after the terminal voltage of the battery 3 exceeds the set voltage. However, the transient state of the generator occurs when the trigger signal is applied to the three-phase thyristors simultaneously to start charging of the battery, and therefore, in order to prevent commutation failure of the thyristors, stopping of the triggering of the thyristors need only be delayed from the time that the trigger signal is applied to the three-phase thyristors simultaneously until the time when the predetermined trigger stop waiting period elapses. When the transient state of the generator has already subsided by the time the terminal voltage of the battery exceeds the set voltage, there is no problem even when supplying of the trigger signal to the thyristors Su through Sw is immediately stopped when the terminal voltage of the battery exceeds the set voltage.

Therefore, in the second embodiment of the present invention, the controller 6 is configured so that the trigger signal is applied to the three-phase thyristors simultaneously when it is detected that the terminal voltage of the battery 3 is equal to or lower than the set voltage, and supplying of the trigger signal to the three-phase thyristors is stopped when it is detected that the terminal voltage of the battery 3 exceeds the set voltage and it is confirmed that the set trigger stop waiting period has already elapsed from the time the trigger signal was applied to the three-phase thyristors simultaneously.

According to such a configuration, supplying of the trigger signal to the thyristors can be immediately stopped without waiting for the trigger stop waiting period to elapse when the transient state of the generator has already subsided by the time it is detected that the terminal voltage of the battery exceeds the set voltage, and it is therefore possible to prevent the trigger signal from being unnecessarily supplied to the thyristors after charging of the battery is completed, and to more precisely control charging of the battery.

The controller 6 used in the present embodiment can also be configured from a timer-function-equipped thyristor trigger circuit 6A and a control part 6B for controlling the thyristor trigger circuit 6A as illustrated in FIG. 1. In this case, the timer-function-equipped thyristor trigger circuit 6A is provided with a timer for measuring the trigger stop waiting period, and the trigger signal is applied to the thyristors Su through Sw immediately when a trigger command is applied, but when the trigger command is extinguished, supplying of the trigger signal to the thyristors Su through Sw is stopped after waiting for the timer to finish measuring the set trigger stop waiting period.

The control part 6B supplies the trigger command signal for triggering of the three-phase thyristors Su through Sw to the thyristor trigger circuit 6A when it is detected that the voltage of the battery 3 is equal to or lower than the set voltage, and sets a measurement value for causing the timer provided to the thyristor trigger circuit 6A to measure the trigger stop waiting period and starts the measurement. The control part 6B also stops supplying of the trigger command to the timer-function-equipped thyristor trigger circuit 6A when it is detected that the terminal voltage of the battery exceeds the set voltage.

The thyristor trigger circuit 6A supplys the trigger signal to the gates of the three-phase thyristors Su through Sw simultaneously when the trigger command signal is applied to the thyristor trigger circuit 6A from the control part 6B. The thyristor trigger circuit 6A also confirms whether the timer has finished measuring the trigger stop waiting period by the time the trigger command signal applied from the control part 6B is extinguished, and when the timer has not finished measuring the trigger stop waiting period (when the transient state of the generator has not subsided after charging of the battery is started), the thyristor trigger circuit 6A allows supplying of the trigger signal to the thyristors Su through Sw to continue, and when the timer has finished measuring the trigger stop waiting period by the time the trigger stop command is applied, the thyristor trigger circuit 6A immediately stops the supplying of the trigger signal to the thyristors Su through Sw.

Figure 3:
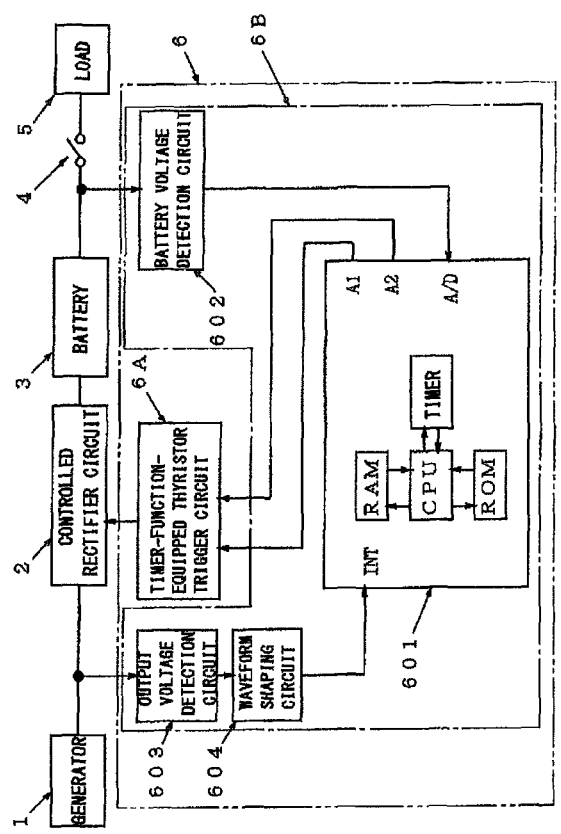
FIG. 3 is a block diagram illustrating the overall configuration of an embodiment of the present invention, as well as constituent elements realized through use of software.

As illustrated in FIG. 3, the control part 6B described above may be configured from: a microcomputer 601 provided with a CPU, a storage device such as RAM or ROM, and a timer, as well as with a predetermined input/output interface, an A/D converter, and other components; a battery voltage detection circuit 602 for detecting the terminal voltage of the battery 3 and applying detection output to the A/D converter of the microcomputer 601; an output voltage detection circuit 603 for detecting a single-phase alternating-current output voltage of the generator 1; and a waveform shaping circuit 604 for converting the waveform of the alternating-current voltage detected by the output voltage detection circuit 603 to a rectangular-wave signal for producing a level change at a zero-cross point of the alternating-current voltage, and applying the rectangular-wave signal to an interrupt input terminal INT of the microcomputer.

The rectangular-wave signal outputted by the waveform shaping circuit 604 exhibits level changes from an H level (high level) to an L level (low level) at zero-cross points where the waveform of the alternating-current voltage transitions from a negative half wave to a positive half wave, and exhibits level changes from L-level to H-level at zero-cross points where the waveform of the alternating-current voltage transitions from a positive half wave to a negative half wave, for example. In this case, the microcomputer executes interrupt processing for calculating the speed of the generator from the time corresponding to one cycle of the output voltage of the generator and the rotation angle of the rotor corresponding to one cycle of the output voltage of the generator each time the signal inputted to the interrupt input terminal INT is recognized as having changed from H-level to L-level (each time a zero-cross point is recognized where the alternating-current voltage waveform transitions from a negative half wave to a positive half wave), and the microcomputer detects the speed of the generator, for example.

The microcomputer 601 is provided with a port A1 for outputting the trigger command when the terminal voltage of the battery detected by the battery voltage detection circuit 602 is equal to or lower than the set voltage and outputting the trigger stop command when the detected battery voltage exceeds the set voltage, and a port A2 for outputting the measurement value set in the timer provided to the thyristor trigger circuit 6A in order to cause the timer to measure the trigger stop waiting period when it is detected that the battery voltage exceeds the set voltage. The trigger command and trigger stop command outputted from the port A1 of the microcomputer 601, and the timer measurement value outputted from the port A2 are inputted to the timer-function-equipped thyristor trigger circuit 6A. The microcomputer 601 executes a program stored in the ROM and thereby realizes various means necessary for controlling the three-phase thyristors Su through Sw of the controlled rectifier circuit.

Figure 4:
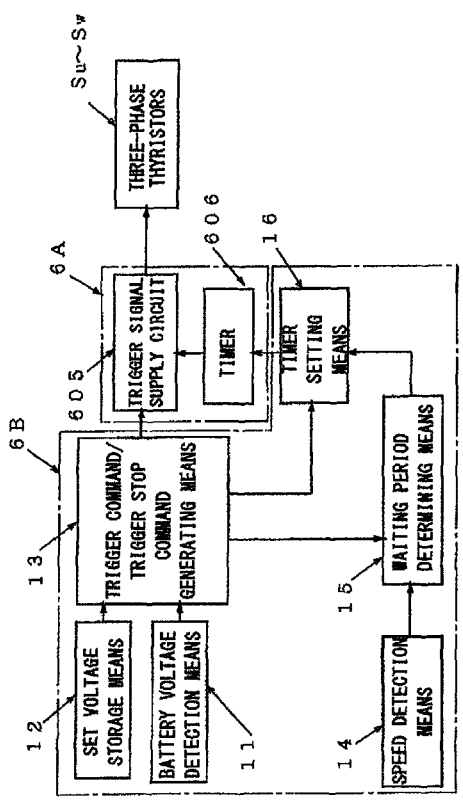
FIG. 4 is a block diagram illustrating the configuration of the controller used in an embodiment of the present invention.

FIG. 4 illustrates the configuration of the timer-function-equipped thyristor trigger circuit 6A and the various means realized by the microcomputer 601 to configure the control part 6B. In FIG. 4, the reference numeral 11 refers to a battery voltage detecting means for reading the output signal of the battery voltage detection circuit 602 and detecting the terminal voltage (battery voltage) of the battery, and 12 refers to a set voltage storage means in which the set voltage of the battery is stored. When the rated voltage is 12 volts, the set voltage is set to 14.5 volts, for example.

In FIG. 4, the reference numeral 13 refers to a trigger command/trigger stop command generating means, and this means compares the battery voltage detected by the battery voltage detecting means 11 and the set voltage read from the set voltage storage means 12, generates a trigger command when the terminal voltage of the battery detected by the battery voltage detecting means is equal to or lower than the set voltage, and generates a trigger stop command when the terminal voltage of the battery detected by the battery voltage detecting means exceeds the set voltage. The trigger command is an H-level (high-level) signal, for example, and the trigger stop command is an L-level (low-level) signal, for example.

The reference numeral 14 refers to a speed detecting means for detecting the speed of the generator. The speed detecting means calculates the speed of the generator from the time corresponding to one cycle of the output voltage of the generator and the rotation angle of the rotor corresponding to one cycle of the output voltage of the generator each time a level change indicating a predetermined zero-cross point in the output voltage of the generator is inputted to the interrupt input terminal INT of the microcomputer.

The reference numeral 15 refers to a waiting period determining means for determining the trigger stop waiting period to be set immediately after the time the trigger signal is applied to the three-phase thyristors simultaneously in order to delay stopping of triggering of the thyristors. In the present embodiment, the waiting period determining means 15 is configured so as to determine the trigger stop waiting period in accordance with the speed of the generator detected by the speed detecting means 14.

The reference numeral 16 refers to a timer setting means, which sets the measurement value for measuring the trigger stop waiting period determined by the waiting period determining means 15 in the timer in the thyristor trigger circuit 6A when the trigger command/trigger stop command generating means 13 generates the trigger command, and causes the timer to begin measurement.

In the example illustrated in FIG. 4, the thyristor trigger circuit 6A is configured from a trigger signal supply circuit 605 and a timer 606. The timer 606 begins the measurement immediately when the measurement value is set by the timer setting means 16. While the timer 606 is measuring the set measurement value, the potential of an output terminal thereof is held at H-level (high level), and the potential of the output terminal is changed to L-level (low level) when measurement of the set measurement value is completed. When the timer 606 is configured in this manner, and the trigger command/trigger stop command generating means 13 is configured so as to generate the H-level trigger command and an L-level trigger stop command when the battery voltage is equal to or lower than the set voltage and when the battery voltage exceeds the set voltage, respectively, the trigger signal supply circuit 605 may be configured from an OR circuit having two input terminals including an input terminal to which the trigger command and the trigger stop command from the trigger command/trigger stop command generating means 13 are applied and an input terminal to which the signal from the timer 606 is applied.

When the trigger signal supply circuit 605 is configured from an OR circuit as described above, when the terminal voltage of the battery is equal to or lower than the set voltage, and the trigger command/trigger stop command generating means 13 generates the H-level trigger command, an H-level trigger signal is applied to the three-phase thyristors Su through Sw from the trigger signal supply circuit 605, and the thyristors are triggered.

If the timer 606 has already finished measuring the trigger stop waiting period, when the terminal voltage of the battery exceeds the set voltage, and the trigger command/trigger stop command generating means 13 generates the L-level trigger stop command, because the output of the timer 606 is L-level and an OR condition is not established, the trigger signal supply circuit 605 stops supplying of the trigger signal to the three-phase thyristors.

If the timer 606 has not yet finished measuring the trigger stop waiting period (the transient state of the generator has not subsided), when the battery voltage exceeds the set voltage and the trigger command/trigger stop command generating means 13 generates the L-level trigger stop command, because the H-level signal is inputted from the timer 606 to the OR circuit constituting the trigger signal supply circuit 605, the trigger signal supply circuit 605 continues to supply the H-level trigger signal to the three-phase thyristors Su through Sw. Consequently, it is possible to prevent a situation in which supplying of the trigger signal to the three-phase thyristors is stopped when the generator is in the transient state, and the thyristors fail to turn off. Therefore, it is possible to prevent a charging current from continuing to flow to the battery and the battery becoming overcharged due to failure to turn off the thyristors. When the timer 606 subsequently finishes measuring the trigger stop waiting period (when the transient state of the generator subsides), the output of the timer 606 becomes L-level, the OR condition of the OR circuit constituting the trigger signal supply circuit 605 is no longer established, and supplying of the trigger signal to the thyristors Su through Sw is stopped. The transient state of the generator has subsided at this time, and it is therefore possible to reliably turn off the thyristors Su through Sw and prevent overcharging of the battery.

Figure 5:
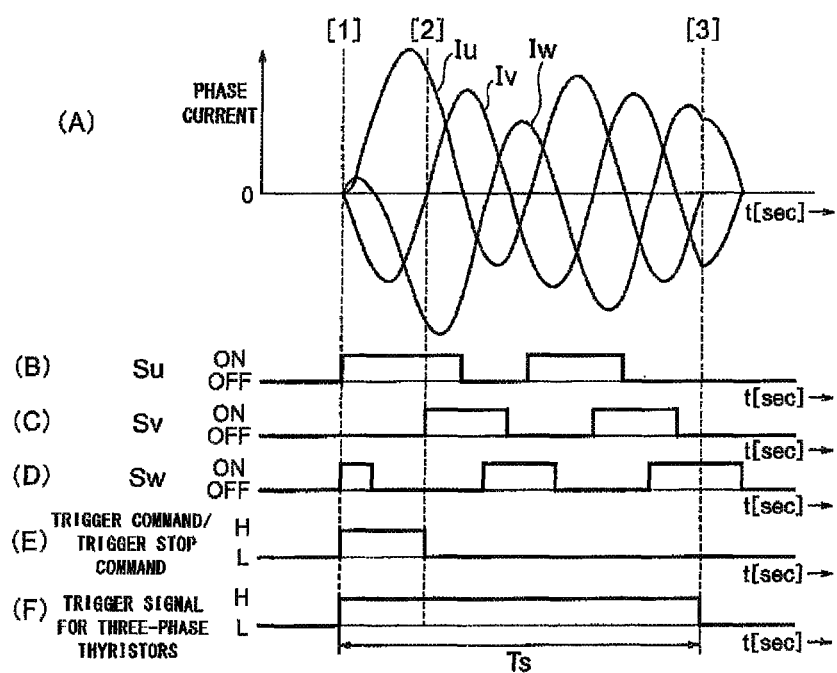
FIG. 5 is a waveform diagram illustrating the waveform of the charging current distributed from the generator to the battery through the controlled rectifier circuit, the on/off operation of the thyristors Su, Sv, Sw, the waveform of a voltage generating a trigger command and a trigger stop command, which has different levels according to whether the battery voltage is equal to or lower than the set voltage or exceeds the set voltage, and the waveform of the trigger signal applied to the gates of the three-phase thyristors, time being plotted on the horizontal axis.

FIG. 5 is a waveform diagram illustrating operation in a case in which the terminal voltage of the battery is equal to or lower than the set voltage, the thyristors Su through Sw are triggered, and a charging current is supplied to the battery, immediately after which a state occurs in which the terminal voltage of the battery exceeds the set voltage. FIG. 5(A) illustrates the waveforms of currents Iu through Iw flowing to the three-phase magneto coils of the generator 1, and FIGS. 5(B) through 5(D) illustrate the ON/OFF operation of the three-phase thyristors Su through Sw. FIG. 5(E) illustrates the trigger command and trigger stop command outputted by the trigger command/trigger stop command generating means 13, and FIG. 5(F) illustrates the trigger signals applied to the thyristors Su through Sw simultaneously.

In the example illustrated in FIG. 5, the battery voltage is equal to or lower than the set voltage at timing [1], and the trigger signals are therefore applied to the thyristors, and charging of the battery is started. Immediately after charging of the battery is started, a transient state occurs in which the peak values of the positive half waves and the negative half waves of the currents Iu through Iw flowing through the three-phase magneto coils of the generator are unbalanced. In the example illustrated in FIG. 5, the terminal voltage of the battery exceeds the set voltage at timing [2] within the period in which the transient state of the generator is in effect, and the trigger stop command is therefore generated. When triggering of the thyristors Su through Sw is stopped at this timing [2], there is a risk of failure to turn off a thyristor that is on at the time the triggering is stopped (the thyristor Su in the example illustrated in FIG. 5), and in the event of failure to turn off the thyristor Su, the charging current continues to flow to the battery, and the battery becomes overcharged. Such a state readily occurs when the speed of the generator is high.

Therefore, in the present invention, a trigger stop waiting period Ts having an appropriate length is set immediately after the timing [1] at which charging of the battery is started, and when the terminal voltage of the battery exceeds the set voltage and a trigger stop command is generated within the trigger stop waiting period, triggering of the thyristors Su through Sw is not stopped, and triggering of the thyristors Su through Sw is stopped (supplying of the trigger signal is stopped) at the timing [3] at which the trigger stop waiting period Ts has elapsed from the timing at which charging of the batter was started. According to such a configuration, the transient state of the generator has subsided at the time that triggering of the thyristors Su through Sw is stopped, and the thyristors can therefore be reliably turned off.

After charging of the battery is started, when the terminal voltage of the battery exceeds the set voltage and the trigger stop command is generated in a state in which the transient state of the generator has subsided, measurement of the trigger stop waiting period Ts is already completed, and triggering of the thyristors Su through Sw is therefore immediately stopped.

Figure 6:
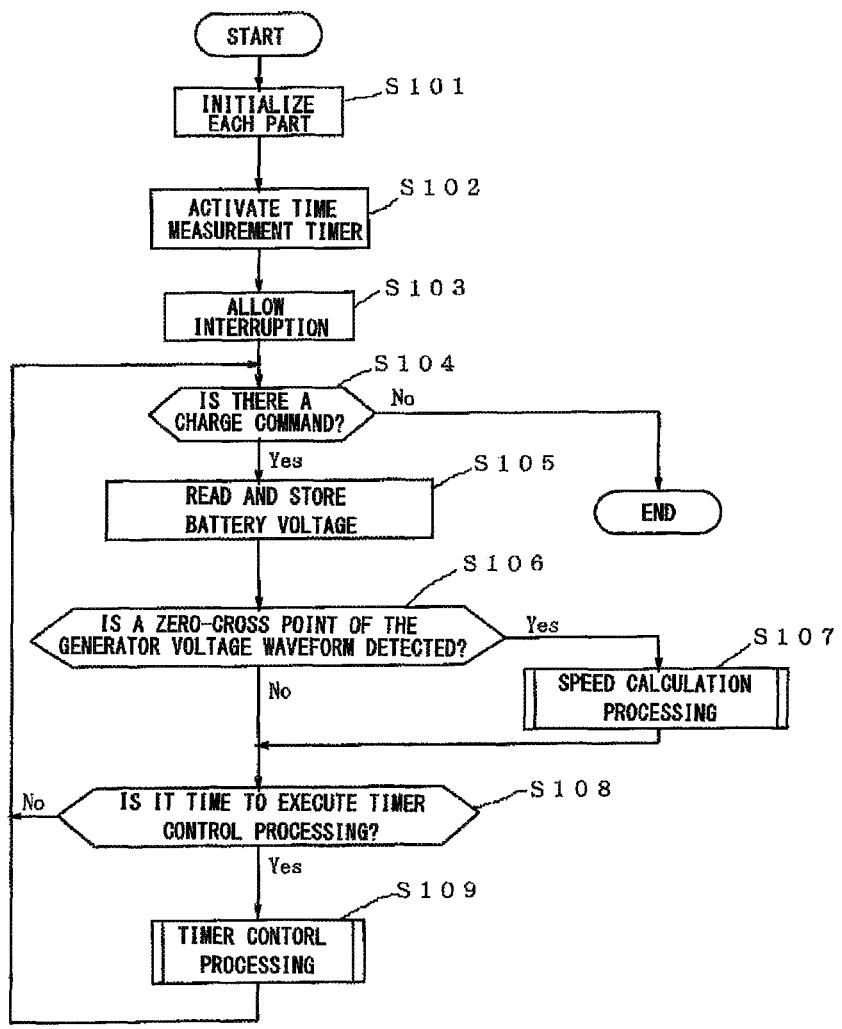
FIG. 6 is a flowchart illustrating an example of the algorithm of a main routine of a program executed by a microcomputer constituting the controller in an embodiment of the present invention.
Figure 7:
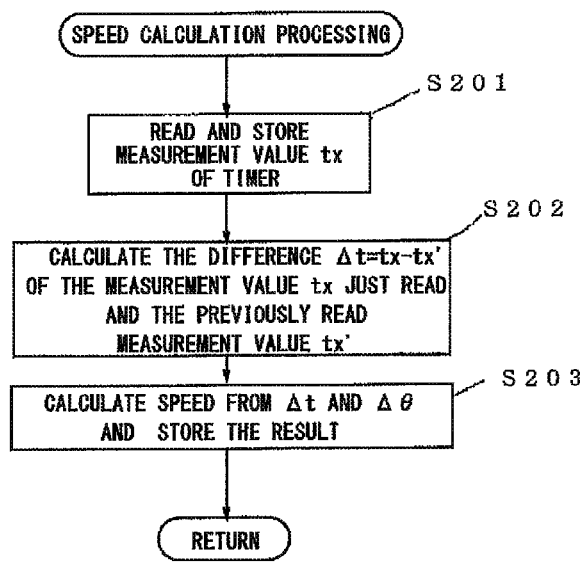
FIG. 7 is a flowchart illustrating an example of the algorithm of speed calculation processing executed by the microcomputer to realize the speed detecting means provided to the controller in an embodiment of the present invention.
Figure 8:
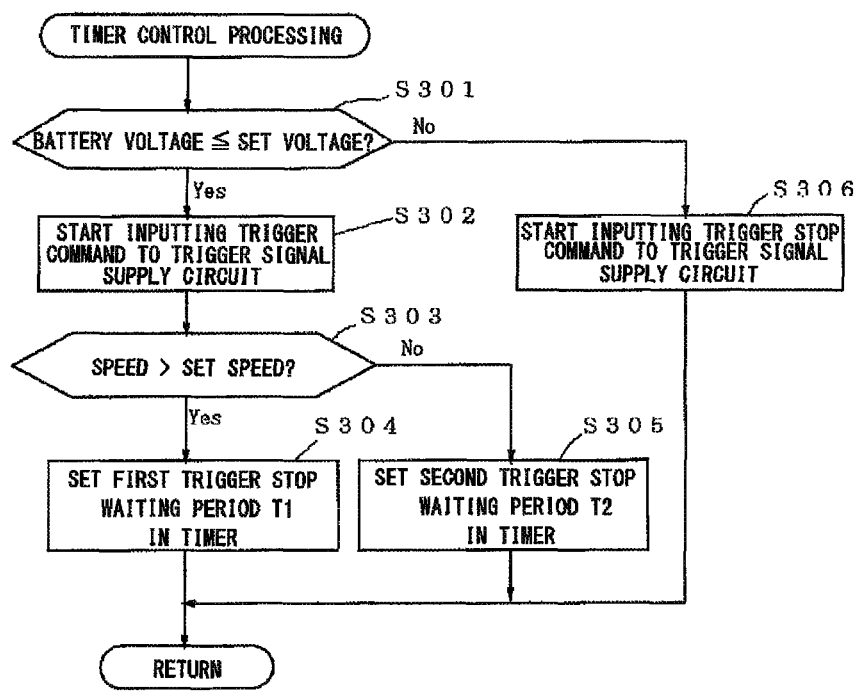
FIG. 8 is a flowchart illustrating an example of the algorithm of a program executed by the microcomputer to realize the waiting period determining means and the thyristor triggering means in an embodiment of the present invention.
Figure 9:
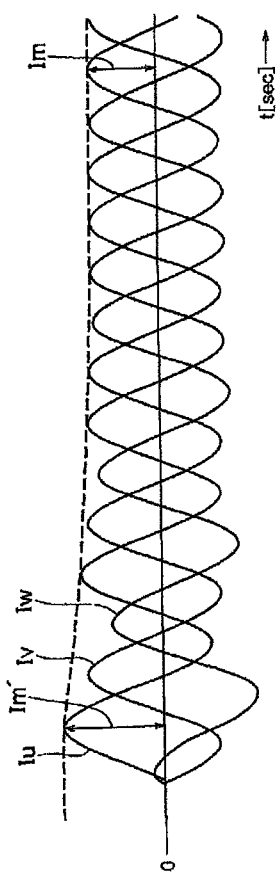
FIG. 9 is a waveform diagram illustrating the occurrence of a transient state when supplying of the charging current to the battery is started, and the settling of the transient state in an open-type battery charging device.
Figure 10:
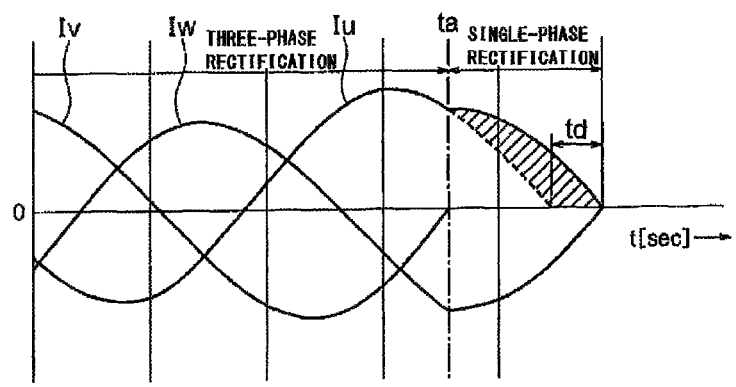
FIG. 10 is a waveform diagram illustrating a three-phase current waveform in the process in which the trigger signal applied to the three-phase thyristors of the controlled rectifier circuit is eliminated and the thyristors are turned off.
Figure 11:
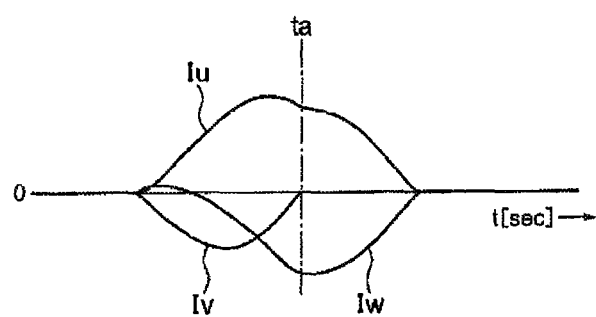
FIG. 11 is a waveform diagram illustrating the current waveform in a case in which a thyristor that is on when the trigger signal applied to the three-phase thyristors of the controlled rectifier circuit is eliminated is successfully turned off.
Figure 12:
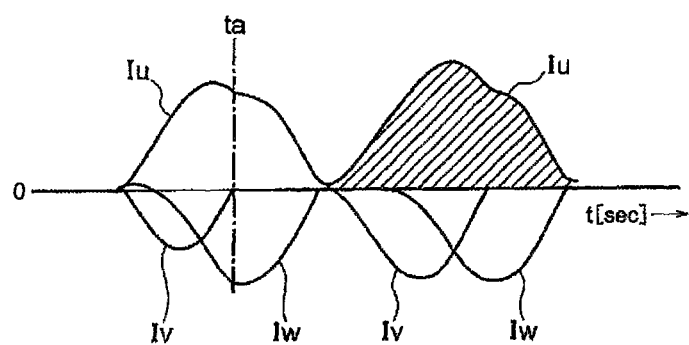
FIG. 12 is a waveform diagram illustrating the current waveform in a case of failure to turn off a thyristor that is on when the trigger signal applied to the three-phase thyristors of the controlled rectifier circuit is eliminated.

In the present embodiment, FIGS. 6 through 8 are flowcharts illustrating an algorithm for the processing executed in the microcomputer 601 in order to configure the means illustrated in FIG. 4. FIG. 6 illustrates a main routine started when a battery charge command is applied for charging of the battery.

When the main routine is started, each part of the microcomputer is first initialized in step S101, and a timer for time measurement in the microcomputer is activated in step S102. Interruption is then allowed in step S103, and it is confirmed in step S104 whether a charge command has been applied. When the result of the confirmation is that a charge command has been applied, the battery voltage detected by the battery voltage detection circuit 602 is read and stored in step S105, and an determination is made in step S106 as to whether a zero-cross point of the output voltage waveform of the generator is detected. When the result of the determination is that a zero-cross point is detected, the process transitions to step S107 and speed calculation processing is performed.

When the result of the determination in step S106 is that a zero-cross point of the generator is not detected, the process proceeds to step S108, and a determination is made as to whether the current timing is a timer control processing execution timing (timing for executing timer control processing). When the result of the termination is that the current timing is not the timer control processing execution timing, the process returns to step S104. When it is determined in step S108 that the current timing is the timer control processing execution timing, the process proceeds to step S109, and timer control processing is executed. The timer control processing execution timing is a timing that arrives each time a certain micro-time period is measured by the timer in the microcomputer. When it is determined in step S104 that a charge command is not applied, the main routine is ended without performing any further actions thereafter.

The speed calculation processing of step S107 in FIG. 6 is performed according to the algorithm illustrated in FIG. 7. In the speed calculation processing illustrated in FIG. 7, a measurement value tx of the timer is first read and stored in step S201, and the difference $\Delta t = tx - tx'$ (the length of one cycle of the output voltage of the generator) of the measurement value tx just read and a previously read measurement value tx' is then calculated in step S202. The speed of the generator is then calculated in step S203 from Δt and the rotation angle Δθ of the rotor corresponding to one cycle of the output voltage of each phase of the generator, the calculated result is stored in the RAM, and the process returns to step S108 in FIG. 6.

The timer control processing of step S109 in FIG. 6 is performed according to the algorithm illustrated in FIG. 8. In the timer control processing illustrated in FIG. 8, an determination is first made in step S301 as to whether the battery voltage is equal to or lower than the set voltage. When the result of the determination is that the battery voltage is equal to or lower than the set voltage, the process proceeds to step S302, a trigger command is generated, and the trigger command is applied to the trigger signal supply circuit 605, after which a determination is made in step S303 as to whether the speed of the generator exceeds a set speed. The set speed is 5000 rpm, for example. When the result of the determination in step S303 is that the speed of the generator exceeds the set speed, the process proceeds to step S304, the measurement value for measuring a first trigger stop waiting period T1 is set in the timer 606 of the timer-function-equipped thyristor trigger circuit, and measurement is immediately started, after which the process returns to step S104 in FIG. 6. When it is determined in step S303 that the speed of the generator is equal to or less than the set speed, the process proceeds to step S305, a measurement value necessary for measuring a second trigger stop waiting period T2 is set in the timer 606 of a timer-equipped thyristor triggering means, and the process returns to step S104 of FIG. 6. When it is determined in step S301 that the battery voltage exceeds the set voltage, the process proceeds to step S306, a trigger stop command is generated, and the trigger stop command is applied to the trigger signal supply circuit 605, after which the processing is ended and the process returns to step S104 of FIG. 6. The first trigger stop waiting period T1 and the second trigger stop waiting period T2 are set so as to be equal to or greater than the time needed for subsiding of the transient state of the generator that occurs when the trigger signal is applied to the three-phase thyristors Su through Sw simultaneously and the three-phase thyristors are turned on. The first trigger stop waiting period T1 and the second trigger stop waiting period T2 may be determined by experimentation. For example, when the set speed of the generator is 5000 rpm, the first trigger stop waiting period T1 is set to a length of 100 μsec or greater, and the second trigger stop waiting period T2 is set to a length of less than 100 μsec.

When the algorithm described above is used, the process of executing steps S301, S302, and S306 in FIG. 8 constitutes the trigger command/trigger stop command generating means 13, and the process of executing steps S201 through S203 in FIG. 7 constitutes the speed detecting means 14. The process of executing steps S303 through S305 in FIG. 8 constitutes the waiting period determining means 15 and the timer setting means 16.

Setting the trigger stop waiting period Ts to the appropriate length makes it possible to prevent the trigger signal from being supplied to the thyristors in a state in which the transient state of the generator has not subsided, and to reliably turn off the thyristors Su through Sw, also when the controller is configured so that the trigger signal is applied to the three-phase thyristors Su through Sw simultaneously when it is detected that the terminal voltage of the battery is equal to or lower than the set voltage, and supplying of the trigger signal to the three-phase thyristors is stopped when it is detected that the terminal voltage of the battery exceeds the set voltage and it is confirmed that the trigger stop waiting period Ts set from the time the trigger signal was applied to the three-phase thyristors simultaneously has already elapsed, as in the embodiment described above. Consequently, the thyristors can reliably be turned off even when phase control for suppressing the occurrence of a transient state at the start of charging of the battery is not performed, and overcharging of the battery can be prevented without causing a decrease in the output of the generator.

When the controller is configured as in the first embodiment described above, supplying of the trigger signal to the thyristors is always stopped after waiting for the trigger stop waiting period to elapse when it is detected that the terminal voltage of the battery exceeds the set voltage, and supplying of the trigger signal to the thyristors is therefore continued until a certain trigger stop waiting period elapses even when the transient state of the generator has already subsided by the time it is detected that the terminal voltage of the battery exceeds the set voltage. In contrast, when the controller is configured as in the second embodiment, supplying of the trigger signal to the thyristors can be immediately stopped without waiting for the trigger stop waiting period to elapse when the transient state of the generator has already subsided by the time it is detected that the terminal voltage of the battery exceeds the set voltage, and it is therefore possible to prevent the trigger signal from being unnecessarily supplied to the thyristors after charging of the battery is completed, and to more precisely control charging of the battery.

In the embodiments described above, the thyristor of each leg constituting the controlled rectifier circuit 2 is provided to the top side of each leg, and the diode is provided to the bottom side of each leg, but the thyristor may be provided to bottom side of each leg and the diode may be provided to the top side of each leg.

In the second embodiment described above, the timer-equipped thyristor triggering means 6A is configured from the trigger signal supply circuit 605 and the timer 606, as illustrated in FIG. 4, but the timer-equipped thyristor triggering means 6A may also be configured from software in the microcomputer.

In the second embodiment described above, the waiting period determining means is configured so that the first trigger stop waiting period T1 is used as the trigger stop waiting period when the speed detected by the speed detecting means is less than the set speed, and the second trigger stop waiting period T2 longer than the first trigger stop waiting period T1 is used as the trigger stop waiting period when the speed detected by the speed detecting means is equal to or greater than the set speed. However, the present invention is not limited to such a configuration for the waiting period determining means. For example, the waiting period determining means may be configured so that a waiting period calculation table for assigning a relationship between the speed of the generator and the optimum length of the trigger stop waiting period is prepared by experimentation and stored in advance in the memory, and the trigger stop waiting period is determined by searching the table for the speed detected by the speed detecting means.

In the second embodiment described above, the speed detecting means is configured so as to detect the speed of the generator from the cycle at which zero-cross points of the output voltage waveform of the generator are detected, but the speed detecting means may also be configured to detect the speed of the generator from the cycle at which the peak points of the output voltage waveform of the generator are detected. The speed detecting means need only be capable of detecting the speed of the generator, and the configuration of the same is not limited to the examples described above. For example, instead of detecting the speed of the generator from the output waveform of the generator, the speed detecting means may be configured so that the speed of the generator is detected from the output of the sensor attached to the generator for outputting a signal including generator speed information. When a magnet AC generator is used as the three-phase AC generator 1, the speed detecting means may be configured so that the speed of the generator is detected from the cycle of a rectangular-wave signal obtained from a Hall IC provided on the stator side of the generator for detecting the polarity of the magnetic poles of a magnet rotor. When the generator is driven by an engine, a configuration may be adopted in which engine speed information is acquired from a speed detecting means provided in a control unit for controlling the engine, and the speed of the generator is detected from the speed information.

What is claimed is:

1. A battery charging device comprising:
a three-phase AC generator;
a full-bridge controlled rectifier circuit for rectifying the output of said three-phase AC generator and supplying a charging current to a battery, the controlled rectifier circuit including a hybrid bridge circuit having three-phase legs, in each of which either one of a top side and a bottom side comprises a thyristor, and the other comprises a feedback diode; and
a controller for controlling the supplying of a trigger signal to the three-phase thyristors provided to the three-phase legs of the controlled rectifier circuit, in accordance with a terminal voltage of the battery;
wherein said controller is configured so that the trigger signal is applied to said three-phase thyristors simultaneously when it is detected that the terminal voltage of said battery is equal to or lower than a set voltage, and when it is detected that the terminal voltage of said battery exceeds the set voltage, supplying of the trigger signal to said three-phase thyristors is stopped when a trigger stop waiting period has elapsed after the terminal voltage of the battery exceeds said set voltage.

2. The battery charging device according to claim 1, wherein said controller comprises:
a battery voltage detection circuit for detecting the terminal voltage of said battery;
trigger command generating means for generating a trigger command signal when the terminal voltage of the battery detected by said battery voltage detection circuit is equal to or lower than the set voltage, and extinguishing said trigger command signal when the terminal voltage of the battery detected by said battery voltage detection circuit exceeds said set voltage; and
a timer-function-equipped thyristor trigger circuit configured so as to supply the trigger signal to said three-phase thyristors simultaneously when said trigger command generating means generates the trigger command signal, and stop supplying of the trigger signal to said three-phase thyristors after waiting for a trigger stop waiting period to elapse when said trigger command signal is extinguished.

3. The battery charging device according to claim 2, wherein
said timer-function-equipped thyristor trigger circuit comprises a timer capacitor connected in parallel through a current-limiting element across gate cathodes of each of said three-phase thyristors and charged through a discharge-inhibiting diode by said trigger command signal when the trigger command signal is generated; and
said timer-function-equipped thyristor trigger circuit is configured so that said trigger stop waiting period is the period for which a current equal to or greater than a threshold value flows across the gate cathodes of the thyristors by discharging of a charge accumulated in said timer capacitor through said current-limiting element and across the gate cathodes of the thyristors at a time constant when said trigger command signal is extinguished.

4. A battery charging device comprising:
a three-phase AC generator;
a full-bridge controlled rectifier circuit for rectifying the output of said three-phase AC generator and supplying the output to a battery, the controlled rectifier circuit including a hybrid bridge circuit having three-phase legs, in each of which either one of a top side and a bottom side comprises a thyristor, and the other comprises a feedback diode; and
a controller for controlling the supplying of a trigger signal to the three-phase thyristors provided to the three-phase legs of said controlled rectifier circuit, in accordance with a terminal voltage of said battery;
wherein said controller is configured so that the trigger signal is supplied to said three-phase thyristors simultaneously when it is detected that the terminal voltage of said battery is equal to or lower than a set voltage, and supplying of the trigger signal to said three-phase thyristors is stopped when it is detected that the terminal voltage of said battery exceeds said set voltage and it is confirmed that the set trigger stop waiting period has already elapsed from the time when the trigger signal was applied to the three-phase thyristors simultaneously.

5. The battery charging device according to claim 4, wherein said controller comprises:
battery voltage detecting means for detecting the terminal voltage of said battery;
waiting period determining means for determining the trigger stop waiting period to be set immediately after the time when the trigger signal is applied to the three-phase thyristors simultaneously in order to delay stopping of triggering of the thyristors;
a timer for starting measurement of a measurement value for measuring the trigger stop waiting period when the measurement value is set;
trigger command/trigger stop command generating means for generating a trigger command when the terminal voltage of the battery detected by the battery voltage detecting means is equal to or lower than the set voltage, and generating a trigger stop command when the terminal voltage of the battery detected by the battery voltage detecting means exceeds the set voltage;
timer setting means for setting a measurement value for measuring the trigger stop waiting period in the timer, in which the timer starts measurement of the measurement value when the trigger command is generated; and
a trigger signal supply circuit for supplying the trigger signal to the three-phase thyristors simultaneously when the trigger command is generated, and stopping the supply of the trigger signal to the three-phase thyristors when the trigger stop command is generated and it is confirmed that the timer has finished measuring the measurement value for measuring the trigger stop waiting period.

6. The battery charging device according to claim 5, wherein said controller further comprises speed detecting means for detecting the speed of said generator; and said waiting period determining means is configured so as to set said trigger stop waiting period in accordance with the speed detected by said speed detecting means.

7. The battery charging device according to claim 6, wherein said waiting period determining means is configured so that a first trigger stop waiting period is used as said trigger stop waiting period when the speed detected by said speed detecting means is less than a set speed, and a second trigger stop waiting period longer than said first trigger stop waiting period is used as the trigger stop waiting period when the speed detected by said speed detecting means is equal to or greater than the set speed.

8. The battery charging device according to claim 1, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

9. The battery charging device according to claim 2, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

10. The battery charging device according to claim 3, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

11. The battery charging device according to claim 4, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

12. The battery charging device according to claim 5, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

13. The battery charging device according to claim 6, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

14. The battery charging device according to claim 7, wherein said trigger stop waiting period is set so as to be equal to or greater than the time needed for subsiding of a transient state of said generator that occurs when the trigger signal is applied to said three-phase thyristors simultaneously and said three-phase thyristors are turned on.

* * * * *